United States Patent [19]
Tsuji et al.

[11] 4,200,358
[45] Apr. 29, 1980

[54] WIDE-ANGLE TYPE ZOOM LENS

[75] Inventors: Sadahiko Tsuji, Yokohama; Yasuhisa Sato, Kawasaki, both of Japan

[73] Assignee: Canon Kabushiki Kaisha, Tokyo, Japan

[21] Appl. No.: 919,770

[22] Filed: Jun. 28, 1978

[30] Foreign Application Priority Data

Jul. 8, 1977 [JP] Japan .................................. 52/81570

[51] Int. Cl.² ............................................. G02B 15/18
[52] U.S. Cl. ...................................... 350/184; 350/212
[58] Field of Search ................. 350/184, 186, 176, 212

[56] References Cited

U.S. PATENT DOCUMENTS

| | | | |
|---|---|---|---|
| 3,377,119 | 4/1968 | Takano | 350/184 |
| 4,135,786 | 1/1979 | Ikemori | 350/184 |

FOREIGN PATENT DOCUMENTS

2551334 11/1975 Fed. Rep. of Germany ........... 350/184

Primary Examiner—Paul A. Sacher
Attorney, Agent, or Firm—Toren, McGeady & Stanger

[57] ABSTRACT

A zoom lens having a focal length range of about 1:9.5 with a relative aperture of 1:1.4 and whose minimum focal length is made shorter than has heretofore been possible to correspond to an image angle of 56° or more, while good stability of aberration correction is maintained throughout the extended zooming range at the increased relative aperture with limitation of the overall dimensions to a minimum. The lens is suitable for cine cameras of small size and includes a positive first group of four lens elements movable for focusing, negative second and negative third groups axially movable to effect zooming, a positive fourth group acting in afocal manner, and a positive fifth group having an image forming function, the first, fourth and fifth groups being stationary during zooming.

4 Claims, 6 Drawing Figures

WIDE-ANGLE TYPE ZOOM LENS

BACKGROUND OF THE INVENTION

This invention relates to zoom lenses suitable for cine cameras of reduced size, and more particularly to a zoom lens with a large aperture ratio and a large range of magnification, whose minimum focal length is shorter than was previously possible.

There exist a wide variety of zoom lenses suited for use in cine cameras of reduced size with large aperture ratios and large varifocal ratios. Of these, there are few which have a relative aperture of 1:1.4 and whose minimum focal length is chosen to cover a total angular field of 54° or more. This is because the conventional design principles are not amenable to optimum correction of the axial and off-axial aberrations for such large relative apertures over the entire zooming range without involving unduly large increase in the bulk and size of the complete lens system either in the diameter of the front component, or in the longitudinal direction, since stabilization of the various aberrations during zooming can be obtained if the refractive power of each lens groups is made weaker.

The zoom lens of the present invention includes as the known configuration a first lens group movable for focusing and consisting of negative, positive, positive, and positive lens elements arranged in this order from the front to contribute positive power to the system, and a second lens group axially movable for variation in focal length of the system and consisting of a negative meniscus lens of forward convexity, and a cemented negative lens of negative and positive lenses arranged in that order from the front.

An object of the present invention is to provide a zoom lens of the character described above, with a relative aperture of 1:1.4 and a varifocal ratio up to 1:9.5, whose minimum focal length corresponds to a total angular field of view as wide as 56°, while maintaining a high standard of aberration correction throughout the entire zooming range with limitation of the overall dimensions to an acceptable level for convenience in carrying about.

To achieve this, the aforesaid front or focusing lens group is constructed and corrected to enable the second lens group as the variator to be imparted with a strong refractive power, thus facilitating minimization of the bulk and size of the complete lens system.

DESCRIPTION OF THE PREFERRED EMBODIMENTS

Figure 1:
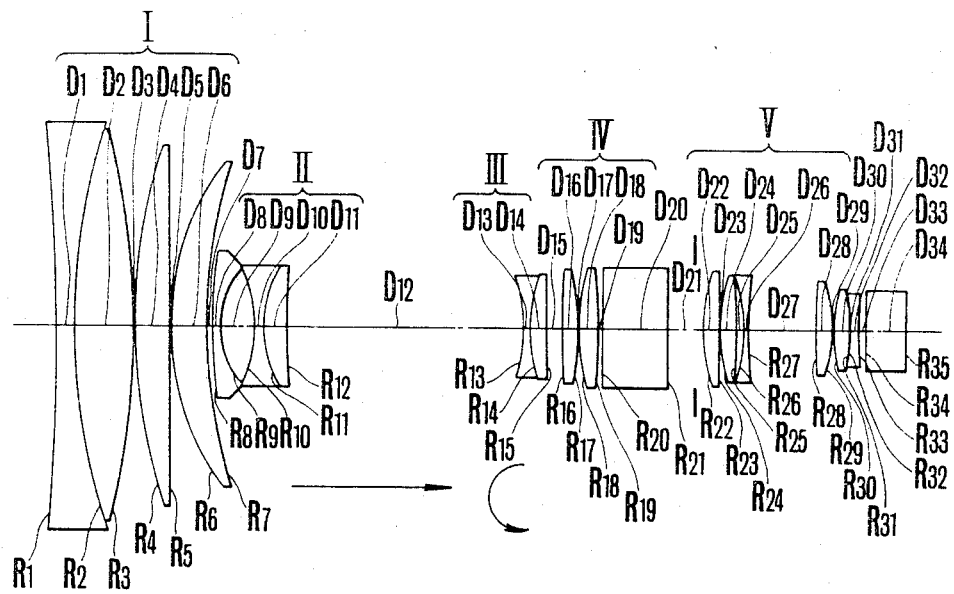
FIG. 1 is a lens block diagram of a first embodiment of a wide angle type zoom lens according to the present invention when set in the minimum focal length position with object at infinity.
Figure 2:
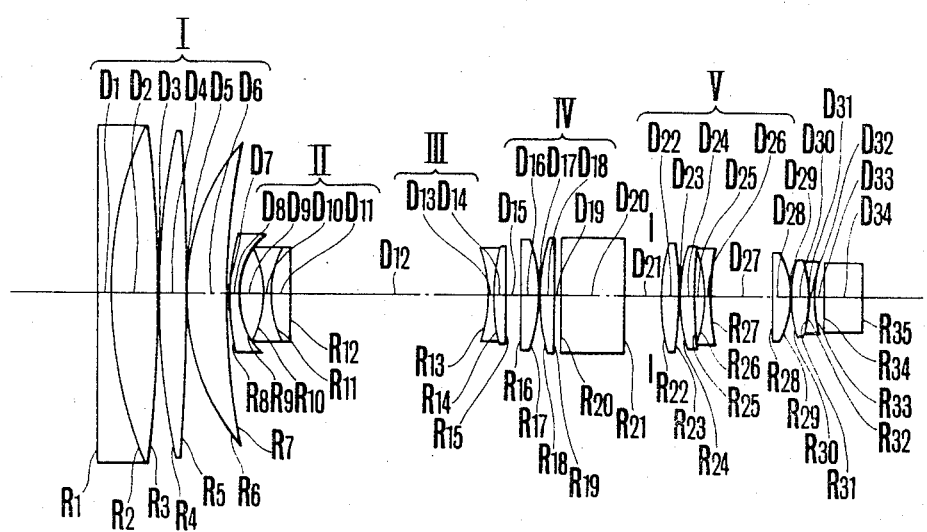
FIGS. 2 and 3 are similar diagrams of second and third embodiments of the present invention.
Figure 3:
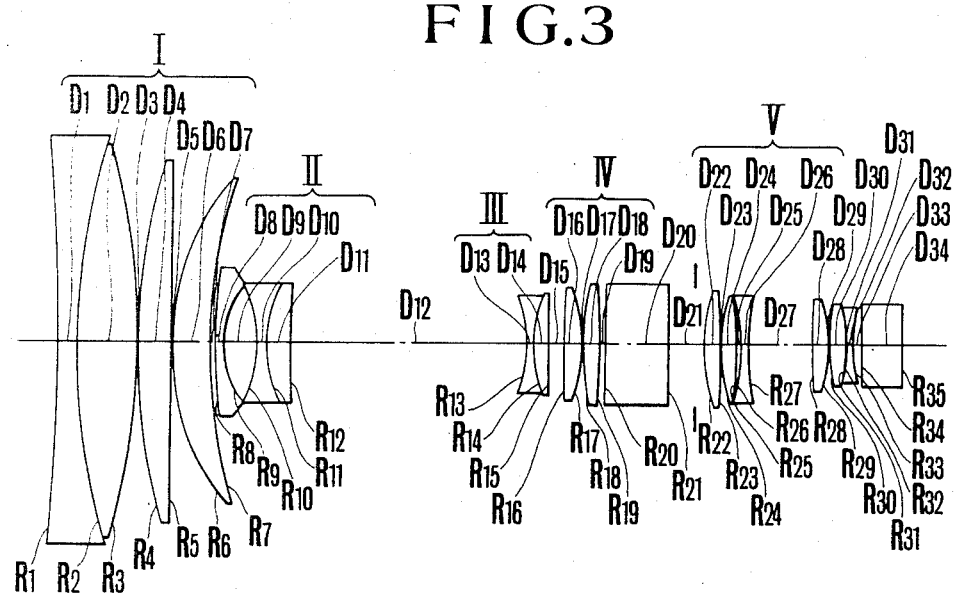
Figure 4:
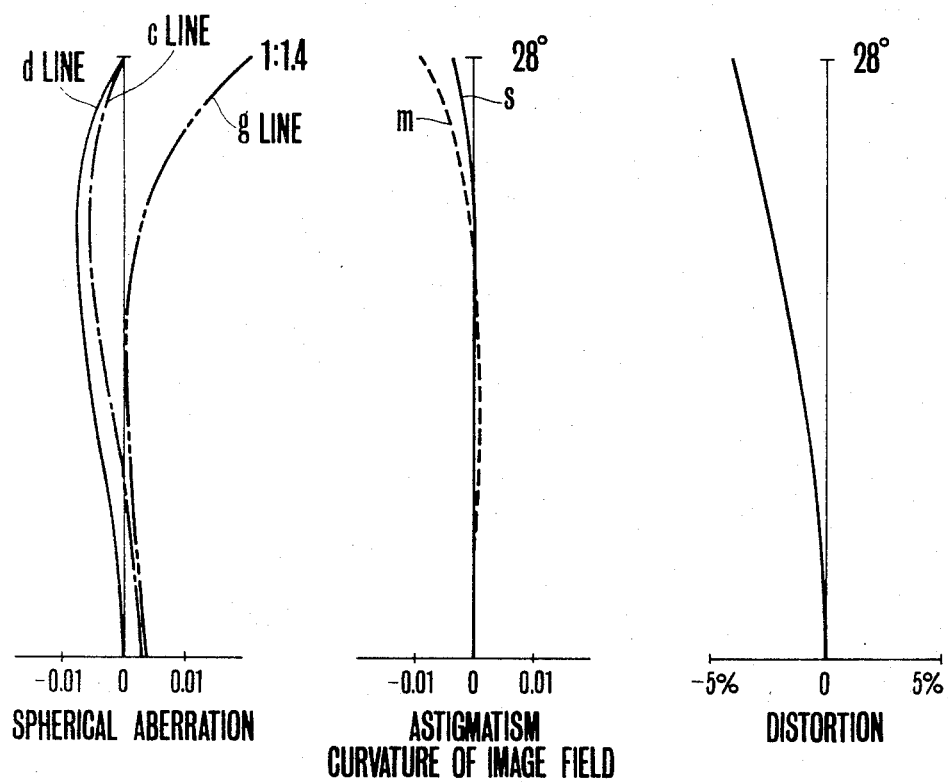
FIG. 4 is graphic representations of the spherical aberrations for the spectral c, d and g lines, astigmatism, field curvature and distortion of the lens of FIG. 1 when in the wide angle setting.
Figure 5:
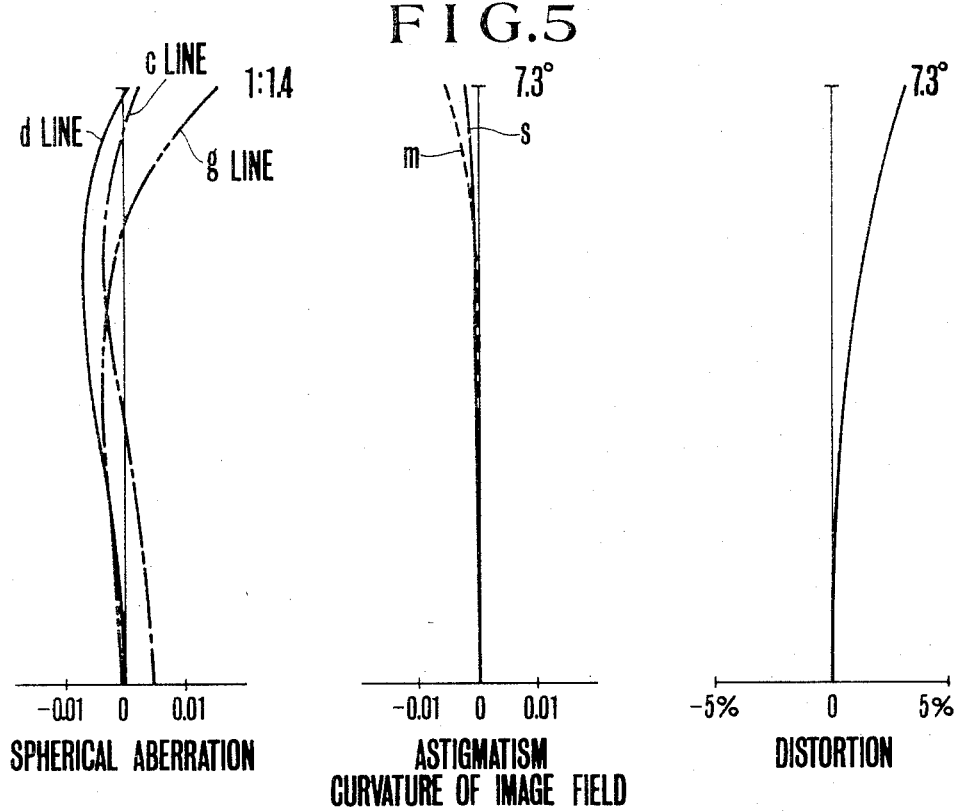
FIGS. 5 and 6 are graphic representations of the aberrations of the lens of FIG. 1 when in the intermediate and telephoto settings respectively.
Figure 6:
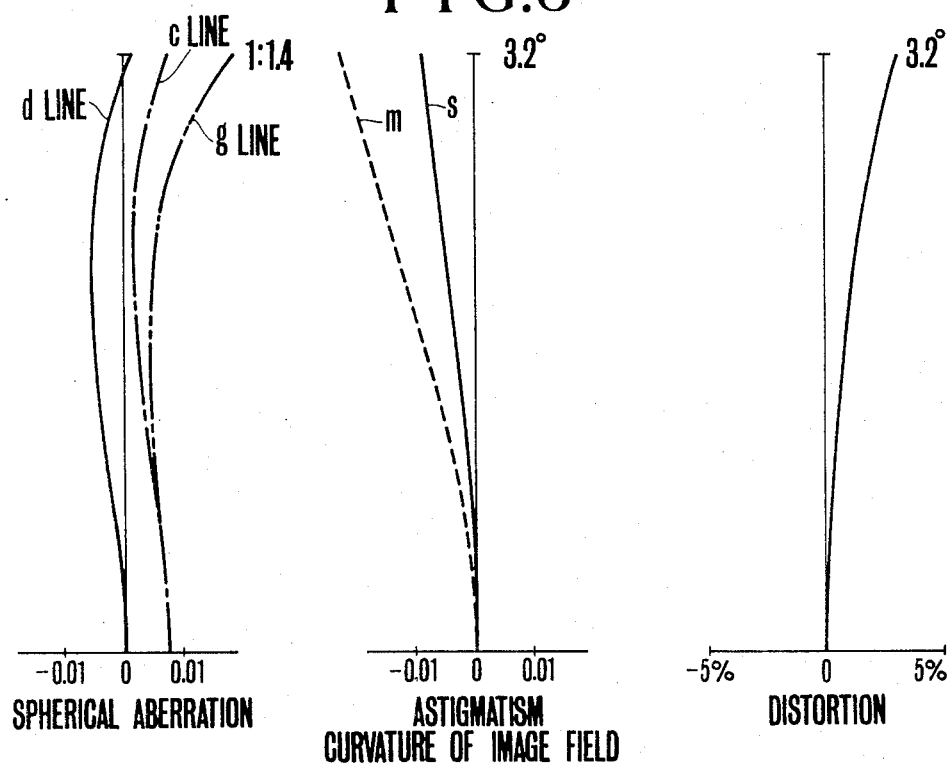

The wide angle type zoom lens according to the invention as shown in FIGS. 1, 2 and 3 has five groups designated by the Roman numerals I, II, III, IV and V, with respect to incident light. Group I consists of four elements of which the first (counting from the front) is a biconcave (FIGS. 1 and 3) or plano-concave lens, the second is a biconvex lens cemented to the first to form a doublet, the third is a plano-convex (FIG. 1) or biconvex lens, the fourth is a positive meniscus lens, and is of positive power. For a given object distance, group I is stationary during zooming. Group II consists of three elements of which the first is a negative meniscus lens convex toward the front, the second is a biconcave lens, and the third is a positive meniscus lens cemented to the second to form a negative doublet. Group III consists of two elements of which the first is a biconcave lens cemented to the second, a plano-convex (FIG. 1) or biconvex lens (FIGS. 2 and 3) to form a negative doublet. Group II is axially movable for variation in focal length of the system, while the image shift compensation is effected by the axial movement of group III in such a manner as to maintain a fixed focal plane throughout the entire zooming range, the minimum separation between groups II and III occurring when the focal length of the system is intermediate between the wide angle and telephoto positions. Group IV is of positive power and functions to make afocal the incident light bundle in passing therethrough. Group V is of positive power and functions to form an image of the object at the plane. A diaphragm is placed between groups IV and V.

The zoom lens of the present invention fulfills the following specific requirements:

$$1.5\ Fw < |F2| < 2.1\ Fw \tag{1}$$

$$-\frac{1}{6\ F1} < \frac{1}{R1} < \frac{1}{6\ F1} \tag{2}$$

$$0.65\ F1 < R6 < 0.75\ F1 \tag{3}$$

$$3|F2| < R8 < 5|F2| \tag{4}$$

$$0.05 < N7 - N6 < 0.25 \tag{5}$$

$$24 < \frac{\nu 5 + \nu 6}{2} - \nu 7 < 36 \tag{6}$$

wherein Fw is the minimum focal length of the entire system; F1 and F2 are the focal lengths of groups I and II respectively; R1 and R6 are the radii of curvature of the first and last but one surfaces in group I respectively; R8 is the radius of curvature of the first surface in group II; N6 and N7 are the refractive indices for the spectral d line of helium of the negative and positive lenses of the doublet in group II respectively; and $\nu 5$, $\nu 6$ and $\nu 7$ are the Abbe numbers of the materials from which the first, second and third elements in group II are respectively made up. The requirement (1) represents the measurement of the total axial movement of group II with reference to the zoom ratio. The larger the zoom ratio, the stronger the refractive power of the variator must be made to effect an equivalent total axial movement. On the other hand, however, the stronger the refractive power of group II, the more difficult the resulting aberrations are to be balanced out by the remaining groups due to the production of higher-order aberrations. According to the present invention, since the focusing group I is constructed from four lens elements to facilitate minimization of the residual aberrations thereof, the refractive power of group II is enabled to be as strong as the factor (1) which involvs no large physical length for the complete lens system.

The requirement (2) within the framework of the general requirement for group I represents the measurement of the diameter of the front component with respect to the minimum focal length of the entire system which is shorter than was previously possible. If the radius of curvature of the first surface is chosen to be large as set forth, the principal plane of group I is shifted toward the rear, approaching so near the principal plane of group II that the overall dimensions of the system are limited to a minimum. When the upper limit is violated, the excessively increased converging action of the first surface R1 makes it difficult to reduce the interval between the principal points of groups I and II to a sufficiently small level, thereby the height of incidence of the principal ray on surface R1 is increased objectionably at the wide angle settings. This involves a very large diameter for the front component in group I. When the lower limit is violated, the diverging action of surface R1 becomes too excessive to achieve good correction of barrel type distortion in the minimum focal length region.

The requirement (3) assists in balancing astigmatism in the minimum focal length region with spherical aberration in the maximum focal length region. The astigmatism and spherical aberration are increased objectionably when the upper and lower limits of the inequality (3) are violated respectively.

The factor (4) seriously affects coma and distortion in the minimum and maximum focal length regions. Variation of the distortion with zooming which generally gives rise to a very difficult problem in the wide angle zoom lens design must be reduced as by making small the first surface in group II. Since group I is well corrected by the provision described above, this surface R8 may be reduced to a comparatively small value in radius of curvature. When the degree of reduction is exceeded from the lower limit, however, it is difficult to achieve good stability of coma which tends to increase with increase in the aperture and zoom ratios.

The requirement (5) assists in compensating for spherical aberration which would be otherwise overcorrected in the maximum focal length region because of the divergent characteristics of group II. The spherical aberration for the axial bundle of light rays at the maximum height of incidence is under-corrected when the upper limit is exceeded. The over-correction of spherical aberration is resulted by the weakening of the converging action when the lower limit is violated.

The requirement (6) represents the achromatism for group II as the variator. The chromatic aberration of group II is over-corrected when the upper limit is exceeded, thus the image chromatic aberration becomes under-corrected in the maximum focal length region. On the other hand, the violation of the lower limit will necessitate an otherwise means for sufficient correction of chromatic aberration of group II, for example, by imparting a very strong curvature to the last surface in this group. This would involve the production of higher order spherical aberration in the maximum focal length region to so large an extent that it is difficult to compensate for.

The numerical date for the three specific zoom lenses represented in FIGS. 1 to 3 are given in the following tables, in which R represents the radii of curvature of the individual surfaces counting from the front, the negative sign indicating that the surface is concave to the front, and D represents the axial separations between the successive two surfaces along with the indices of refraction N, for the spectral d line of helium and the Abbe numers, $\nu$, of the materials of which the various lens elements are made. The second section of each of the tables gives the values of the variable air separations for the wide angle, normal and telephoto settings with object at infinity. The third section gives the values of the factors set forth in the requirements (1) to (6). The zoom lens contains two beam splitters with plane surfaces R20 and R21, and R34 and R35.

EXAMPLE I

| Focal length f = 1–9.5 No. | R | F-number 1.4 D | Angular field of view $2\omega = 56° - 6°$ N | $\nu$ |
|---|---|---|---|---|
| 1 | −66.9639 | 0.5084 | 1.80518 | 25.4 |
| 2 | 16.6244 | 1.4983 | 1.60311 | 60.7 |
| 3 | −18.5615 | 0.0224 | | |
| 4 | 14.8846 | 0.8427 | 1.60311 | 60.7 |
| 5 | ∞ | 0.0224 | | |
| 6 | 6.4009 | 0.9515 | 1.60311 | 60.7 |
| 7 | 13.6142 | variable | | |
| 8 | 8.4250 | 0.1944 | 1.71300 | 53.9 |
| 9 | 2.1745 | 0.8646 | | |
| 10 | −3.2902 | 0.1944 | 1.71300 | 53.9 |
| 11 | 2.4903 | 0.6742 | 1.80518 | 25.4 |
| 12 | 27.2391 | variable | | |
| 13 | −3.2651 | 0.1495 | 1.76200 | 40.2 |
| 14 | 4.2084 | 0.3681 | 1.80518 | 25.4 |
| 15 | ∞ | variable | | |
| 16 | 25.9631 | 0.4468 | 1.60311 | 60.7 |
| 17 | −5.2782 | 0.0150 | | |
| 18 | 8.6093 | 0.4610 | 1.60311 | 60.7 |
| 19 | −13.9780 | 0.1047 | | |
| 20 | ∞ | 1.6449 | 1.51633 | 64.1 |
| 21 | ∞ | 0.8972 | | |
| 22 | 4.2149 | 0.4336 | 1.60311 | 60.7 |
| 23 | −179.6943 | 0.0224 | | |
| 24 | 5.2289 | 0.4037 | 1.60311 | 60.7 |
| 25 | −19.3257 | 0.1298 | | |
| 26 | −4.8322 | 0.1495 | 1.80518 | 25.4 |
| 27 | 9.0354 | 1.7346 | | |
| 28 | 11.3451 | 0.4486 | 1.64850 | 53.0 |
| 29 | −3.2344 | 0.2243 | | |
| 30 | 4.1072 | 0.4187 | 1.63636 | 35.4 |
| 31 | −6.7594 | 0.0603 | | |
| 32 | −3.5498 | 0.1495 | 1.80518 | 25.4 |
| 33 | 14.6707 | 0.1944 | | |
| 34 | ∞ | 1.0168 | 1.63854 | 55.4 |
| 35 | ∞ | | | |

| | Lens Separation during Zooming | | |
|---|---|---|---|
| f | d7 | d12 | d15 |
| 1.0 | 0.1438 | 6.0267 | 0.3992 |
| 4.1863 | 4.3472 | 1.4222 | 0.8004 |
| 9.5964 | 5.5996 | 0.6429 | 0.3273 |

$F1 = 9.5866$,
$F2 = -2.0187$,
$1/R1 = -1/6.9852 F1$,
$R6 = 0.6677 F1$,
$R8 = 4.1735|F2|$,
$N7 - N6 = 0.09218$,
$\frac{\nu 5 + \nu 6}{2} - \nu 7 = 28.5$

EXAMPLE II

| Focal length f = 1–9.5 No. | R | F-number 1.4 D | Angular field of view $2\omega = 56°-6°$ N | $\nu$ |
|---|---|---|---|---|
| 1 | ∞ | 0.2986 | 1.80518 | 25.4 |
| 2 | 9.6276 | 1.2691 | 1.60311 | 61.0 |

-continued

| Focal length f = 1-9.5 | | Angular field of view 2ω = 56°-6° | |
|---|---|---|---|
| No. | R | D | N | ν |
| 3 | −29.7967 | 0.0224 | | |
| 4 | 21.7056 | 0.6719 | 1.69350 | 53.2 |
| 5 | −54.4699 | 0.0224 | | |
| 6 | 5.7892 | 0.9704 | 1.69350 | 53.2 |
| 7 | 15.9189 | variable | | |
| 8 | 6.5665 | 0.1493 | 1.77250 | 49.6 |
| 9 | 1.8067 | 0.6719 | | |
| 10 | −2.6730 | 0.1493 | 1.71300 | 53.9 |
| 11 | 2.2232 | 0.5226 | 1.80518 | 25.4 |
| 12 | 31.5507 | variable | | |
| 13 | −3.8480 | 0.1493 | 1.77250 | 49.6 |
| 14 | 10.2036 | 0.2986 | 1.80518 | 25.4 |
| 15 | −35.3124 | variable | | |
| 16 | 32.8391 | 0.4180 | 1.60311 | 61.0 |
| 17 | −6.2361 | 0.0149 | | |
| 18 | 4.8319 | 0.4180 | 1.60311 | 61.0 |
| 19 | 272.2644 | 0.1493 | | |
| 20 | ∞ | 1.6423 | 1.51633 | 64.1 |
| 21 | ∞ | 0.9257 | | |
| 22 | 5.2951 | 0.4628 | 1.60311 | 61.0 |
| 23 | −12.1817 | 0.0224 | | |
| 24 | 4.0138 | 0.4180 | 1.60311 | 61.0 |
| 25 | 51.7578 | 0.2086 | | |
| 26 | −3.9179 | 0.1642 | 1.80518 | 25.4 |
| 27 | 8.8859 | 1.5784 | | |
| 28 | −19.0651 | 0.4479 | 1.71300 | 53.2 |
| 29 | −2.7638 | 0.0224 | | |
| 30 | 2.9272 | 0.4778 | 1.63636 | 35.4 |
| 31 | −3.8049 | 0.0269 | | |
| 32 | −3.2541 | 0.1493 | 1.80518 | 25.4 |
| 33 | 7.6137 | 0.1941 | | |
| 34 | ∞ | 1.0152 | 1.63854 | 55.4 |
| 35 | ∞ | | | |

| Lens Separation during Zooming | | | |
|---|---|---|---|
| f | d7 | d12 | d15 |
| 1.0 | 0.1459 | 5.0751 | 0.3632 |
| 3.3456 | 3.2813 | 1.2755 | 1.0274 |
| 9.5000 | 4.6751 | 0.5460 | 0.3632 |

F1 = 7.9733,
F2 = −1.6423,
1/R1 = 0
R6 = 0.7261 F1,
R8 = 3.9984 |F2|,
N7 − N6 = 0.09218,
$\frac{\nu 5 + \nu 6}{2} - \nu 7 = 26.35$

EXAMPLE III

| Focal length f = 1.0-9.5 | | Angular field 2ω = 56°-6° | |
|---|---|---|---|
| No. | R | D | N | ν |
| 1 | −70.5253 | 0.5234 | 1.80518 | 25.4 |
| 2 | 16.5940 | 1.4177 | 1.60311 | 60.7 |
| 3 | −18.9263 | 0.0224 | | |
| 4 | 14.4711 | 0.8569 | 1.60311 | 60.7 |
| 5 | −538.3921 | 0.0224 | | |
| 6 | 6.4879 | 0.9277 | 1.60311 | 60.7 |
| 7 | 13.4032 | variable | | |
| 8 | 8.6984 | 0.1869 | 1.71300 | 53.9 |
| 9 | 2.1072 | 0.8832 | | |
| 10 | −2.9966 | 0.1869 | 1.60311 | 60.7 |
| 11 | 2.6637 | 0.6554 | 1.80518 | 25.4 |
| 12 | 12.1432 | variable | | |
| 13 | −3.2554 | 0.1346 | 1.76200 | 40.2 |
| 14 | 3.9659 | 0.3627 | 1.80518 | 25.4 |
| 15 | −11706.58 | variable | | |
| 16 | 26.4307 | 0.4510 | 1.60311 | 60.7 |
| 17 | −5.2251 | 0.0150 | | |
| 18 | 8.7499 | 0.4696 | 1.60311 | 60.7 |
| 19 | 13.8382 | 0.1047 | | |
| 20 | ∞ | 1.6449 | 1.63854 | 64.1 |
| 21 | ∞ | 0.8972 | | |
| 22 | 4.2149 | 0.4336 | 1.60311 | 60.7 |
| 23 | −179.6943 | 0.0224 | | |
| 24 | 5.2289 | 0.4037 | 1.60311 | 60.7 |
| 25 | −19.3257 | 0.1298 | | |
| 26 | −4.8322 | 0.1495 | 1.80518 | 25.4 |
| 27 | 9.0354 | 1.7346 | | |
| 28 | 11.3451 | 0.4486 | 1.64850 | 53.0 |
| 29 | −3.2344 | 0.2243 | | |
| 30 | 4.1072 | 0.4187 | 1.63636 | 35.4 |
| 31 | −6.7594 | 0.0603 | | |
| 32 | −3.5498 | 0.1495 | 1.80518 | 25.4 |
| 33 | 14.6707 | 0.1944 | | |
| 34 | ∞ | 1.0168 | 1.63854 | 55.4 |
| 35 | ∞ | | | |

| Lens Separation during Zooming | | | |
|---|---|---|---|
| f | d7 | d12 | d15 |
| 1.0 | 0.1438 | 6.0267 | 0.3992 |
| 4.1863 | 4.3472 | 1.4222 | 0.8004 |
| 9.5964 | 5.5996 | 0.6429 | 0.3273 |

F1 = 9.5866,
F2 = −2.0187,
1/R1 = −1/7.3567 F1,
R6 = 0.6768 F1,
R8 = 4.3089|F2|,
N7 − N6 = 0.20207,
$\frac{\nu 5 + \nu 6}{2} - \nu 7 = 31.9$

What is claimed is:

1. A wide angle type zoom lens comprising, from the direction in which light enters,
   a first lens group consisting of negative, positive, positive and positive lenses, and having a positive refractive power, said group being axially movable for focusing;
   a second lens group consisting of a negative meniscus lens of forward convexity and a negative cemented lens of negative and positive lenses and having a negative refractive power;
   a third lens group consisting of a negative cemented lens of negative and positive lenses, whereby when said second lens group is axially moved to effect zooming, said third lens group performs image shift compensating movement;
   a fourth lens group having a positive refractive power and having a function of making substantially afocal the light bundle existing therefrom; and
   a fifth lens group having a positive refractive power and having an image forming function, said wide angle type zoom lens being characterized by the following relationships:

$$1.5\ Fw < |F2| < 2.1\ Fw \quad (1)$$

$$-\frac{1}{6\ F1} < \frac{1}{R1} < \frac{1}{6\ F1} \quad (2)$$

$$0.65\ F1 < R6 < 0.75\ F1 \quad (3)$$

$$3|F2| < R8 < 5|F2| \quad (4)$$

$$0.05 < N7 - N6 < 0.25 \quad (5)$$

-continued $$24 < \frac{\nu5 + \nu6}{2} - \nu7 < 36 \quad (6)$$

wherein Fw is the focal length of the entire system in the wide angle side; F1 is the focal length of the first lens group; F2 is the focal length of the second lens group; R1 is the radius of curvature of the first surface in the first lens group; R6 is the radius of curvature of the front surface of the last lens in the first lens group; R8 is the radius of curvature of the first surface in the second lens group; N6 is the refractive index for the spectral d line of the negative lens of the cemented lens in the second lens group; N7 is the index of refraction for the spectral d line of the positive lens of the cemented lens in the second lens group; $\nu5$ is the Abbe number for the spectral d line of the negative meniscus lens in the second lens group; $\nu6$ is the Abbe number for the spectral d line of the negative lens of the cemented lens in the second lens group; and $\nu7$ is the Abbe number for the spectral d line of the positive lens of the cemented lens in the second lens group.

2. A wide angle type zoom lens as in claim 1, satisfying the following data for the radii of curvature, R, the axial separations between the surfaces, D, the refractive indices, N, and Abbe numbers, $\nu$, for the spectral d line

| No. | R | D | N | $\nu$ |
|---|---|---|---|---|
| 1 | −66.9639 | 0.5084 | 1.80518 | 25.4 |
| 2 | 16.6244 | 1.4983 | 1.60311 | 60.7 |
| 3 | −18.5615 | 0.0224 | | |
| 4 | 14.8846 | 0.8427 | 1.60311 | 60.7 |
| 5 | ∞ | 0.0224 | | |
| 6 | 6.4009 | 0.9515 | 1.60311 | 60.7 |
| 7 | 13.6142 | variable | | |
| 8 | 8.4250 | 0.1944 | 1.71300 | 53.9 |
| 9 | 2.1745 | 0.8646 | | |
| 10 | −3.2902 | 0.1944 | 1.71300 | 53.9 |
| 11 | 2.4903 | 0.6742 | 1.80518 | 25.4 |
| 12 | 27.2391 | variable | | |
| 13 | −3.2651 | 0.1495 | 1.76200 | 40.2 |
| 14 | 4.2084 | 0.3681 | 1.80518 | 25.4 |
| 15 | ∞ | variable | | |
| 16 | 25.9631 | 0.4468 | 1.60311 | 60.7 |
| 17 | −5.2782 | 0.0150 | | |
| 18 | 8.6093 | 0.4610 | 1.60311 | 60.7 |
| 19 | −13.9780 | 0.1047 | | |
| 20 | ∞ | 1.6449 | 1.51633 | 64.1 |
| 21 | ∞ | 0.8972 | | |
| 22 | 4.2149 | 0.4336 | 1.60311 | 60.7 |
| 23 | −179.6943 | 0.0224 | | |
| 24 | 5.2289 | 0.4037 | 1.60311 | 60.7 |
| 25 | −19.3257 | 0.1298 | | |
| 26 | −4.8322 | 0.1495 | 1.80518 | 25.4 |
| 27 | 9.0354 | 1.7346 | | |
| 28 | 11.3451 | 0.4486 | 1.64850 | 53.0 |
| 29 | −3.2344 | 0.2243 | | |
| 30 | 4.1072 | 0.4187 | 1.63636 | 35.4 |
| 31 | −6.7594 | 0.0603 | | |
| 32 | −3.5498 | 0.1495 | 1.80518 | 25.4 |
| 33 | 14.6707 | 0.1944 | | |
| 34 | ∞ | 1.0168 | 1.63854 | 55.4 |
| 35 | ∞ | | | |

| Variable Separation | Focal length f = 1 − 9.5 | | |
|---|---|---|---|
| F | 1.0 | 4.1863 | 9.5964 |
| d7 | 0.1438 | 4.3472 | 5.5996 |
| d12 | 6.0267 | 1.4222 | 0.6429 |
| d15 | 0.3992 | 0.8004 | 0.3273 |

A block of R20 and R21 and a block of R34 and R35 are beam splitters.

3. A wide angle type zoom lens as in claim 1, satisfying the following data for the radii of curvature, R, the axial separations, D, the refractive indices, N, and the Abbe numbers, $\nu$, for the spectral d line

| No. | R | D | N | $\nu$ |
|---|---|---|---|---|
| 1 | ∞ | 0.2986 | 1.80518 | 25.4 |
| 2 | 9.6276 | 1.2691 | 1.60311 | 61.0 |
| 3 | −29.7967 | 0.0224 | | |
| 4 | 21.7056 | 0.6719 | 1.69350 | 53.2 |
| 5 | −54.4699 | 0.0224 | | |
| 6 | 5.7892 | 0.9704 | 1.69350 | 53.2 |
| 7 | 15.9189 | variable | | |
| 8 | 6.5665 | 0.1493 | 1.77250 | 49.6 |
| 9 | 1.8067 | 0.6719 | | |
| 10 | −2.6730 | 0.1493 | 1.71300 | 53.9 |
| 11 | 2.2232 | 0.5226 | 1.80518 | 25.4 |
| 12 | 31.5507 | variable | | |
| 13 | −3.8480 | 0.1493 | 1.77250 | 49.6 |
| 14 | 10.2036 | 0.2986 | 1.80518 | 25.4 |
| 15 | −35.3124 | variable | | |
| 16 | 32.8391 | 0.4180 | 1.60311 | 61.0 |
| 17 | −6.2361 | 0.0149 | | |
| 18 | 4.8319 | 0.4180 | 1.60311 | 61.0 |
| 19 | 272.2644 | 0.1493 | | |
| 20 | ∞ | 1.6423 | 1.51633 | 64.1 |
| 21 | ∞ | 0.9257 | | |
| 22 | 5.2951 | 0.4628 | 1.60311 | 61.0 |
| 23 | −12.1817 | 0.0224 | | |
| 24 | 4.0138 | 0.4180 | 1.60311 | 61.0 |
| 25 | 51.7578 | 0.2086 | | |
| 26 | −3.9179 | 0.1642 | 1.80518 | 25.4 |
| 27 | 8.8859 | 1.5784 | | |
| 28 | −19.0651 | 0.4479 | 1.71300 | 53.2 |
| 29 | −2.7638 | 0.0224 | | |
| 30 | 2.9272 | 0.4778 | 1.63636 | 35.4 |
| 31 | −3.8049 | 0.0269 | | |
| 32 | −3.2541 | 0.1493 | 1.80518 | 25.4 |
| 33 | 7.6137 | 0.1941 | | |
| 34 | ∞ | 1.0152 | 1.63854 | 55.4 |
| 35 | ∞ | | | |

| Variable Separation | Focal length f = 1−9.5 | | |
|---|---|---|---|
| F | 1.0 | 3.3456 | 9.5000 |
| d7 | 0.1459 | 3.2813 | 4.6751 |
| d12 | 5.0751 | 1.2755 | 0.5460 |
| d15 | 0.3632 | 1.0274 | 0.3632 |

A block of R20 and R21 and a block of R34 and R35 are beam splitters.

4. A wide angle type zoom lens as in claim 1, satisfying the following data for the radii of curvature, R, the axial separations, D, the refractive indices, N, and the Abbe numbers, $\nu$, for the spectral d line

| No. | R | D | N | $\nu$ |
|---|---|---|---|---|
| 1 | −70.5253 | 0.5234 | 1.80518 | 25.4 |
| 2 | 16.5940 | 1.4177 | 1.60311 | 60.7 |
| 3 | −18.9263 | 0.0224 | | |
| 4 | 14.4711 | 0.8569 | 1.60311 | 60.7 |
| 5 | −538.3921 | 0.0224 | | |
| 6 | 6.4879 | 0.9277 | 1.60311 | 60.7 |
| 7 | 13.4032 | variable | | |
| 8 | 8.6984 | 0.1869 | 1.71300 | 53.9 |
| 9 | 2.1072 | 0.8832 | | |
| 10 | −2.9966 | 0.1869 | 1.60311 | 60.7 |
| 11 | 2.6637 | 0.6554 | 1.80518 | 25.4 |
| 12 | 12.1432 | variable | | |
| 13 | −3.2554 | 0.1346 | 1.76200 | 40.2 |
| 14 | 3.9659 | 0.3627 | 1.80518 | 25.4 |
| 15 | −11706.58 | variable | | |
| 16 | 26.4307 | 0.4510 | 1.60311 | 60.7 |

-continued

| No. | R | D | N | ν |
|---|---|---|---|---|
| 17 | −5.2251 | 0.0150 | | |
| 18 | 8.7499 | 0.4696 | 1.60311 | 60.7 |
| 19 | 13.8382 | 0.1047 | | |
| 20 | ∞ | 1.6449 | 1.63854 | 64.1 |
| 21 | ∞ | 0.8972 | | |
| 22 | 4.2149 | 0.4336 | 1.60311 | 60.7 |
| 23 | −179.6943 | 0.0224 | | |
| 24 | 5.2289 | 0.4037 | 1.60311 | 60.7 |
| 25 | −19.3257 | 0.1298 | | |
| 26 | −4.8322 | 0.1495 | 1.80518 | 25.4 |
| 27 | 9.0354 | 1.7346 | | |
| 28 | 11.3451 | 0.4486 | 1.64850 | 53.0 |
| 29 | −3.2344 | 0.2243 | | |
| 30 | 4.1072 | 0.4187 | 1.63636 | 35.4 |
| 31 | −6.7594 | 0.0603 | | |

-continued

| No. | R | D | N | ν |
|---|---|---|---|---|
| 32 | −3.5498 | 0.1495 | 1.80518 | 25.4 |
| 33 | 14.6707 | 0.1944 | | |
| 34 | ∞ | 1.0168 | 1.63854 | 55.4 |
| 35 | ∞ | | | |

| Variable Separation | Focal length f = 1−9.5964 | | |
|---|---|---|---|
| F | 1.0 | 4.1863 | 9.5964 |
| d7 | 0.1438 | 4.3472 | 5.5996 |
| d12 | 6.0267 | 1.4222 | 0.6429 |
| d15 | 0.3992 | 0.8004 | 0.3273 | a block of R20 and R21 and a block of R34 and R35 being beam splitters.

* * * * *